(12) United States Patent
Ono

(10) Patent No.: US 11,097,880 B2
(45) Date of Patent: Aug. 24, 2021

(54) PACKAGING CONTAINER

(71) Applicant: TETRA LAVAL HOLDINGS & FINANCE S.A., Pully (CH)

(72) Inventor: Kazuya Ono, Tokyo (JP)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 17/046,476

(22) PCT Filed: Apr. 9, 2019

(86) PCT No.: PCT/JP2019/015401
§ 371 (c)(1),
(2) Date: Oct. 9, 2020

(87) PCT Pub. No.: WO2019/198695
PCT Pub. Date: Oct. 17, 2019

(65) Prior Publication Data
US 2021/0032001 A1    Feb. 4, 2021

(30) Foreign Application Priority Data

Apr. 11, 2018 (JP) .............................. JP2018-075844

(51) Int. Cl.
*B65D 65/40* (2006.01)
*B65D 85/72* (2006.01)
(Continued)

(52) U.S. Cl.
CPC ................ *B65D 65/40* (2013.01); *B32B 7/12* (2013.01); *B32B 27/10* (2013.01); *B32B 27/32* (2013.01);
(Continued)

(58) Field of Classification Search
CPC ............ B32B 2255/10; B32B 2255/20; B32B 2255/26; B32B 2255/28; B32B 2260/021;
(Continued)

(56) References Cited

U.S. PATENT DOCUMENTS

2001/0051273 A1   12/2001  Veerasamy
2010/0213169 A1    8/2010  Hiraoka
(Continued)

FOREIGN PATENT DOCUMENTS

JP     2001232734 A    8/2001
JP     2006025607 A    2/2006
(Continued)

OTHER PUBLICATIONS

International Search Report (PCT/ISA/210) dated May 14, 2019, by the Japanese Patent Office as the International Searching Authority for International Application No. PCT/JP2019/015401.
(Continued)

*Primary Examiner* — Yan Lan
(74) *Attorney, Agent, or Firm* — Buchanan Ingersoll & Rooney PC

(57) ABSTRACT

A packaging container having excellent water repelling properties on the outer or inner surface of the packaging container includes at least an outer resin layer, a paper core layer, and an inner resin layer. Minute protrusions are formed on the surface of the outer resin layer or the inner resin layer, and the minute protrusion structure has a fractal dimension of 1.08 to 1.17, wherein the fractal dimension is a numeric value calculated by the box count method at a resolution at which the length per one pixel is 0.5-1.0 μm.

8 Claims, 5 Drawing Sheets

(51) Int. Cl.
  *B65D 5/40* (2006.01)
  *B32B 7/12* (2006.01)
  *B32B 27/10* (2006.01)
  *B32B 27/32* (2006.01)

(52) U.S. Cl.
  CPC ............... *B65D 5/40* (2013.01); *B65D 85/72* (2013.01); *B32B 2439/70* (2013.01)

(58) Field of Classification Search
  CPC .......... B32B 2260/046; B32B 2262/00; B32B 2274/00; B32B 2307/416; B32B 2307/50; B32B 23/04; B32B 23/08; B32B 23/10; B32B 23/22; B32B 2457/00; B32B 27/06; B32B 27/08; B32B 27/12; B32B 27/22; B32B 27/285; B32B 27/30; B32B 27/302; B32B 27/304; B32B 27/306; B32B 27/308; B32B 27/32; B32B 27/322; B32B 27/36; B32B 27/365; B32B 27/38; B32B 27/40; B32B 37/025; B32B 38/06; B32B 3/02; B32B 3/263; B32B 3/30; B32B 5/024; B32B 7/02; B32B 7/12; B32B 9/005; B32B 9/007; B32B 9/04; B32B 9/045; B32B 17/10018; B32B 17/1033; B32B 17/10577; B32B 2439/70; B32B 27/10; B01L 3/50825; Y10T 156/1041; Y10T 428/21; Y10T 428/24545; Y10T 428/24612; Y10T 428/30; H01R 13/4361; B65D 5/40; B65D 65/40; B65D 85/72
  See application file for complete search history.

(56) References Cited

U.S. PATENT DOCUMENTS

| | | |
|---|---|---|
| 2013/0065007 A1 | 3/2013 | Hiraoka |
| 2015/0108032 A1* | 4/2015 | Akutsu ................ B32B 27/22 |
| | | 206/524.4 |

FOREIGN PATENT DOCUMENTS

| | | |
|---|---|---|
| JP | 2010199298 A | 9/2010 |
| JP | 2013071779 A | 4/2013 |
| JP | 5647774 B2 | 11/2014 |
| JP | 2014218007 A | 11/2014 |
| JP | 2014218008 A | 11/2014 |
| JP | 2015066770 A | 4/2015 |
| JP | 2015112781 A | 6/2015 |
| JP | 2016150769 A | 8/2016 |
| JP | 2017200832 A | 11/2017 |

OTHER PUBLICATIONS

Written Opinion (PCT/ISA/237) dated May 14, 2019, by the Japanese Patent Office as the International Searching Authority for International Application No. PCT/JP2019/015401.

Japanese Office Action issued by the Japanese Patent Office dated Aug. 21, 2018 in Japanese Patent Application No. 2018-075844 with English language translation (7 pgs).

Japanese Office Action issued by the Japanese Patent Office dated Jan. 22, 2019 in Japanese Patent Application No. 2018-075844 with English language translation (7 pgs).

\* cited by examiner

Cross sectional SEM photograph of comparative example 1 x 100

PACKAGING CONTAINER

TECHNICAL FIELD

The present invention relates to a packaging container to be filled with a liquid food product, food powder, or the like.

BACKGROUND ART

In packaging containers, cooling water used during container producing normally adheres to the container surface. It is therefore desirable that the surface of the packaging container has the characteristic of being non-adhesive such that water does not readily adhere thereto, or the characteristic that water droplets attached thereto are easily removed.

Polyolefin materials such as polyethylene and polypropylene are widely used in packaging containers. Packing materials normally have a multilayer structure including aluminum foil, PET film, paperboard, and the like, but polyolefins have excellent waterproofing properties and heat sealing properties and are therefore used for the outermost surface and the innermost surface of the container.

Polyethylene and polypropylene polymers used in packaging container materials are non-polar polymers, and consequently have a lower surface free energy than polyester and the like, and exhibit water-repellency, having a water contact angle at least equal to 90°.

However, if the surface on the outside of the container (container outer surface) is coated with a polyolefin resin layer such as polyethylene or polypropylene, cooling water used during container producing forms water droplets which remain adhered to the container outer surface, and may adversely affect printing of the date or the like on the container finished product, or image analysis during an appearance inspection.

Further, if the surface on the inside of the container (container inner surface) is coated with a polyolefin resin layer such as polyethylene or polypropylene, contents such as high viscosity yogurt, tomato juice, or the like, may remain adhered to the container inner surface for an extended period of time. There is thus a desire for higher water-repellency, and non-adhesion such that water droplets are not readily retained.

As a method for increasing the water-repellency of the container surface, one can mention a method in which surface tension is reduced by using polytetrafluoroethylene or the like having a lower critical surface tension than polyethylene or polypropylene, for example.

However, such materials are more expensive than general purpose polyolefin resins, and have insufficient lamination processability and heat sealing properties, for example, which are required of packing materials for food containers. It is therefore difficult to use such materials for food containers.

As other methods for increasing the water-repellency of the container inner surface, or an inside surface of a lid provided on a container, there are, for example, methods in which the shape of the surface is changed to reduce the surface area of contact with respect to water droplets.

Examples of such methods include a method in which the water-repellency is improved by reducing the surface area of contact with respect to water droplets, by causing hydrophobic fine particles to adhere to the surface (see patent literature article 1), a method in which the surface roughness is controlled to impart unevenness during molding of polyethylene (see patent literature article 2), and a method in which partial fluffing of the surface is performed (see patent literature article 3).

PRIOR ART LITERATURE

Patent Literature

Patent literature article 1: Japanese Patent No. 5647774
Patent literature article 2: Japanese Unexamined Patent Application Publication 2016-150769
Patent literature article 3: Japanese Unexamined Patent Application Publication 2014-218008

SUMMARY OF INVENTION

Problems to be Resolved by the Invention

The types of food products stored in the container may be limited when conventional methods are employed, in which modifications are made to the resin material of the container inner surface or the container outer surface, or to additive materials such as fine particles. Further, in conventional methods in which the surface roughness of the container inner surface or outer surface is controlled, even if the surface roughness is set to lie within a desired range, the anticipated water repelling effect may not be obtained, depending on the shape of the surface. In particular, the latter issue is an observation first discovered by the inventors of the present invention.

The objective of the present invention is to provide a packaging container with which water-repellency of the outside surface of the packaging container is increased, such that adhesion and retention of water droplets during manufacture of the packaging container are reduced, and to provide a packaging container with which water-repellency of the inside surface of the packaging container is increased, such that high viscosity contents are not readily retained on the surface on the inside of the container after the food product has been drunk. In particular, the objective is to provide a packaging container in which a resin layer provided on the inner surface or the outer surface of the packaging container does not include a release agent, an additive to increase the water-repellency, or fine particles for adjusting the surface roughness, for example, and in which water-repellency is enhanced on the basis of a new indicator, irrespective of a parameter of the surface roughness of the resin layer.

Means of Overcoming the Problems

A packaging container according to one embodiment of the present invention is a packaging container for food, wherein fine protrusions are formed on a surface of an inside resin layer or an outside resin layer included in the packaging container, and a fractal dimension of the structure of the fine protrusions is at least equal to 1.08. Further, the packaging container according to one embodiment of the present invention is a packaging container for food, provided with a container main body, a synthetic resin portion provided in an upper portion of the container main body, and a cap provided on an upper portion of the synthetic resin portion, wherein fine protrusions are formed on an inside or an outside surface of the synthetic resin portion, and the fractal dimension of the structure of the fine protrusions is at least equal to 1.08.

Further, in the packaging container according to an embodiment of the present invention, the outside resin layer or the inside resin layer includes a polyolefin resin.

Further, in the packaging container according to an embodiment of the present invention, the polyolefin resin includes polyethylene.

Further, in the packaging container according to an embodiment of the present invention, the fractal dimension of the structure of the fine protrusions is 1.08 or more to 1.17 or less.

Further, in the packaging container according to an embodiment of the present invention, the fractal dimension is a numerical value obtained by means of analysis at a resolution at which the length per one pixel is 0.5 to 1.0 µm.

Next, a method for manufacturing a packing material according to an embodiment of the present invention is a method for manufacturing a packing material for use in a packaging container, including a step of laminating an outside resin layer, a paper core layer, and an inside resin layer, and a step of forming fine protrusions on the surface of the outside resin layer or the inside resin layer using a die or a roller having fine holes, wherein a fractal dimension of the structure of the fine protrusions is at least equal to 1.08.

Further, in the method for manufacturing a packaging container according to an embodiment of the present invention, the fractal dimension of the structure of the fine protrusions is 1.08 or more to 1.17 or less.

Further, in the method for manufacturing a packaging container according to an embodiment of the present invention, the fractal dimension is a numerical value obtained by means of analysis at a resolution at which the length per one pixel is 0.5 to 1.0 µm.

Advantages of the Invention

According to the present invention as described hereinabove, it is possible to provide a packaging container with which water-repellency of the surface is increased, such that adhesion and retention of water droplets during manufacture of the packaging container are reduced, and to provide a packaging container with which high viscosity contents are not readily retained on the surface on the inside of the container.

MODES OF EMBODYING THE INVENTION

One Embodiment (Packaging Container)

Figure 1A:
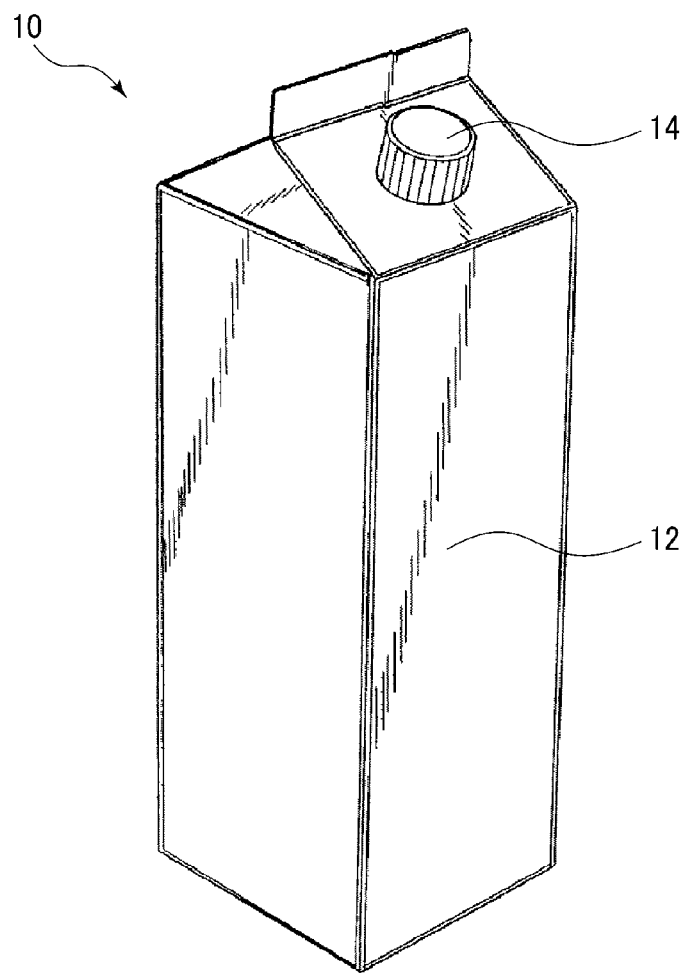
FIGS. 1(A) and 1(B) are external views illustrating packaging containers according to an embodiment of the present invention.
Figure 1B:
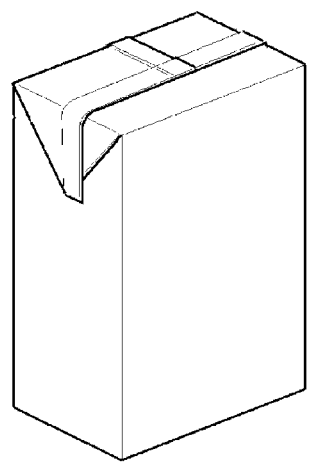

A packaging container according to one embodiment of the present invention will be described with reference to FIG. 1 to FIG. 3. FIGS. 1(A) and 1(B) illustrate the appearance of packaging containers according to the present embodiment, FIG. 2 is a drawing illustrating a packing material for use in the packaging container according to the present embodiment, and FIG. 3 is a drawing illustrating a portion of the packaging container according to the present embodiment.

A packaging container 10 in the present embodiment has a gable top shape, as illustrated in FIG. 1(A), for example. A packaging container main body 12 accommodating a liquid food product or food powder, for example, is provided with a cap 14. Further, the packaging container in the present embodiment may also be brick shaped, as illustrated in FIG. 1(B).

Another shape that may be adopted by the packaging container in the present embodiment is a synthetic resin composite (a packaging container provided with a container main body, a synthetic resin portion provided in an upper portion of the container main body, and a cap provided on the upper portion of the synthetic resin portion.)

Figure 2:
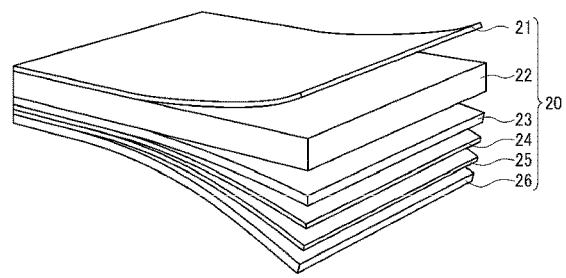
FIG. 2 is a drawing illustrating a packing material for use in a packaging container according to an embodiment of the present invention.
Figure 3:
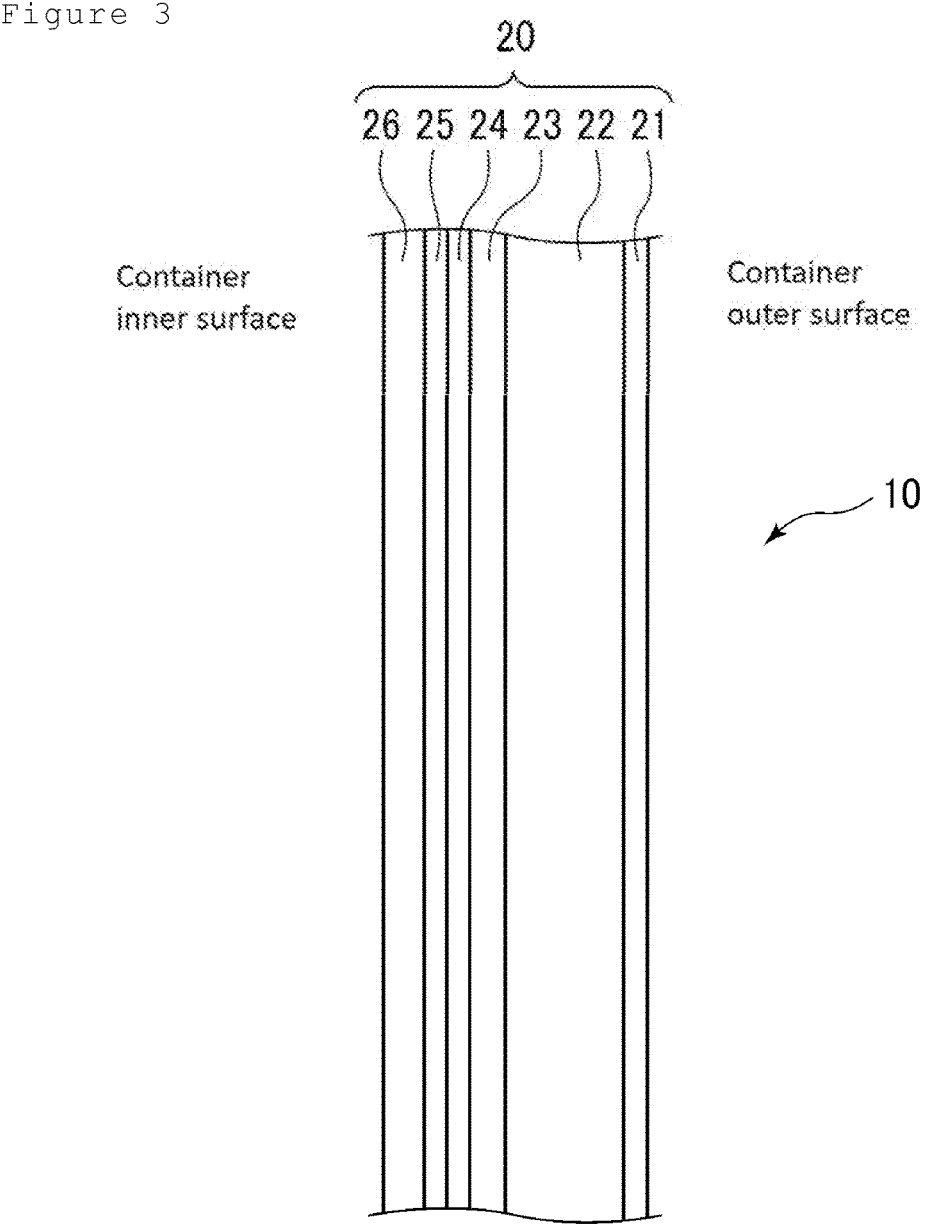
FIG. 3 is a drawing illustrating a portion of a packaging container according to an embodiment of the present invention.

FIG. 2 illustrates an example of a packing material 20 forming the packaging container 10 in the present embodiment.

The packing material 20 in the present embodiment is obtained by laminating, from the upper surface, an outside resin layer 21, a paper core layer 22, an adhesive resin layer 23, a barrier layer 24, an inner coating layer 25, and an inside resin layer 26.

In FIG. 2, the outside resin layer 21 has the functions of providing heat sealing properties during container molding, and water resistance, comprises a polyolefin resin, includes low-density polyethylene, for example, and has a thickness of 10 to 30 µm, for example.

The paper core layer 22 has the function of maintaining mechanical strength as a container, is formed from single-layer or multilayer paperboard, for example, and has a basis weight of 100 to 400 g/m², for example.

The adhesive resin layer 23 has the function of bonding the barrier layer to the paper core layer, is formed from low-density ethylene, for example, and has a thickness of 5 to 30 µm, for example.

The barrier layer 24 has the function of a gas barrier, is formed from aluminum foil, for example, and has a thickness of 5 to 15 µm, for example.

The inner coating layer 25 has the function of bonding the barrier layer to the inner surface resin layer, is formed from a copolymer of ethylene and acrylic acid, for example, and has a thickness of 5 to 30 µm, for example.

The inside resin layer 26 has the function of heat sealing during container molding, comprises a polyolefin resin, includes low-density polyethylene, for example, and has a thickness of 10 to 50 µm, for example.

Further, the outside resin layer 21 and the inside resin layer 26 can include resin other than low-density polyethylene (LDPE). For example, it is possible to include one, two or more types of polymer selected from linear low-density polyethylene (LLDPE), metallocene catalyzed linear low-density polyethylene (mLLDPE), medium-density polyethylene, high-density polyethylene, polypropylene, polyethylene naphthalate, and cyclic olefin copolymers.

The packaging container in the present invention includes at least the outside resin layer 21, the paper core layer 22, and the inside resin layer 26, and the barrier layer 24, the adhesive resin layer 23, the inner coating layer 25 are optionally included in accordance with the use and function of the container.

(Fractal Structure of Outside or Inside Surface of Packaging Container)

FIG. 3 illustrates a portion of the packaging container 10 in the present embodiment.

In FIG. 3, the left hand side of the packing material 20 forming the packaging container 10 is the inner surface side of the packaging container 10 (the inside surface of the packaging container), that is, the side in contact with the filled food product or the like, and the right hand side of the packing material 20 is the outer surface side of the packaging container 10 (the outside surface of the packaging container), that is, the side exposed to outside air.

The packaging container 10 in the present embodiment is characterized in that protrusions having a fractal structure are formed on the surface on the outer surface side that is exposed to the outside air, thereby enhancing water-repellency, and reducing adhesion and retention of water droplets during manufacture of the packaging container.

The protrusions having a fractal structure are formed on the surface of the outside resin layer 21 on the right hand side of the packing material 20 illustrated in FIG. 3. The fractal dimension of the fractal structure on the surface of the outside resin layer 21 is desirably approximately 1.08 or more, measured using the box counting method. Further, the fractal dimension of the fractal structure on the surface of the outside resin layer 21 more desirably lies in a range of approximately 1.08 to approximately 1.17, measured using the box counting method. The fractal structure and the fractal dimension are discussed hereinafter.

By forming the outside surface of the packaging container 10 in this way, cooling water used during the manufacture of the packaging container can be prevented from forming water droplets that adhere to and remain on the outside surface, adversely affecting printing of the date or the like on the container finished product, or image analysis during an appearance inspection.

Further, another embodiment of the packaging container 10 of the present embodiment is characterized in that protrusions having a fractal structure are formed on the inside surface that is in contact with the filled food product or the like, thereby making contents such as the food product less liable to remain on the surface on the inside of the container.

The protrusions having a fractal structure are formed on the surface of the inside resin layer 26 on the left hand side of the packing material 20 illustrated in FIG. 3. The fractal dimension of the fractal structure on the surface of the inside resin layer 26 is desirably approximately 1.08 or more, measured using the box counting method. Further, the fractal dimension of the fractal structure on the surface of the inside resin layer 26 more desirably lies in a range of approximately 1.08 to approximately 1.17, measured using the box counting method.

Forming the inner surface of the packaging container 10 in this way makes it possible to prevent problems such as the retention of high viscosity yogurt, tomato juice, or the like, adhered to the inner surface of the packaging container 10, for an extended period of time after the food product in the packaging container has been drunk.

(Fractal Structure)

A fractal is a concept introduced in the analysis of shapes having complex structures. In geometry, an object of which the whole and a part, in particular, have self-similarity is known as a self-similar fractal, the structure being such that the self-similar shape appears and never becomes flat even when the part is enlarged. Furthermore, a figure having a fractal shape adopts a non-integer dimension.

For example, the fractal dimension of a Koch curve, which is one simple self-similar fractal figure, is approximately 1.26, which is larger than that of a simple straight line, which is one-dimensional. In the natural world, the coastlines of ria coasts are self-similar fractals, and the fractal dimension thereof is said to be approximately 1.3. Meanwhile, although chains of mountains in a mountain range have large undulations, the ridge lines become flatter when viewed from farther away. The shape of apart therefore changes when enlarged or reduced in size, and is therefore not self-similar. However, similar shapes can be obtained by arbitrarily varying the aspect ratio, and this case is known as a self-affine fractal.

Methods for obtaining the fractal dimension include the box counting method, a divider method, a scale conversion method, a cover-based method, a field of view enlargement method, a turning radius method, and a density correlation function method, for example. In the present embodiment, the fractal dimension is measured using the box counting method.

A container inside or outside surface including multiple fine protrusions of which the cross section is a self-affine fractal, as in the present embodiment, exhibits good non-adhesion (water-repellency). The fractal dimension is desirably 1.08 or more, and from the viewpoint of packaging container manufacture, more preferably lies within a range at approximately 1.17 or less.

The inventors of the present invention found experimentally that good non-adhesion (water-repellency) is not exhibited with a fractal structure having a fractal dimension smaller than 1.08.

Further, the inventors of the present invention found experimentally that although a fractal structure having a fractal dimension greater than 1.17 exhibits good non-adhesion, it is difficult to detach the resin from rollers or dies during molding. Therefore, from the viewpoint of mass production of packaging containers using a filling machine, the fractal dimension is preferably 1.17 or less.

In self-affine fractals, the fractal dimension also depends on the scale used for image analysis. The fractal dimension in the invention of the present application is desirably a numerical value obtained by analyzing a digital image at a resolution at which the length per one pixel is 0.5 to 1.0 µm. Although the fractal dimension can also be obtained by analysis at a resolution with a reduced magnification, a small amount of error may be contained in the numerical value of the fractal dimension, depending on the resolution, due to the impact of the size of the fractal structure. According to an analysis performed by the inventors of the present invention, it was found that there were almost no errors with a resolution at which the length per one pixel is 0.5 to 1.0 µm.

It should be noted that although the contact angle increases if non-adhesion is good, no clear correlation between the two was found. With a polyethylene surface, the contact angle increases as the surface area increases, as explained by Wenzel's theory.

However, even if the contact angle is very large, contradictory phenomena, namely the lotus effect and the petal effect, are observed, and therefore the contact angle is not preferable as an indicator of non-adhesion. It is consequently preferable to evaluate non-adhesion from the angle at which a droplet slides along an inclined platform (fall angle). A specific measuring method will be discussed hereinafter.

(Method for Manufacturing Packaging Container)

Figure 4:
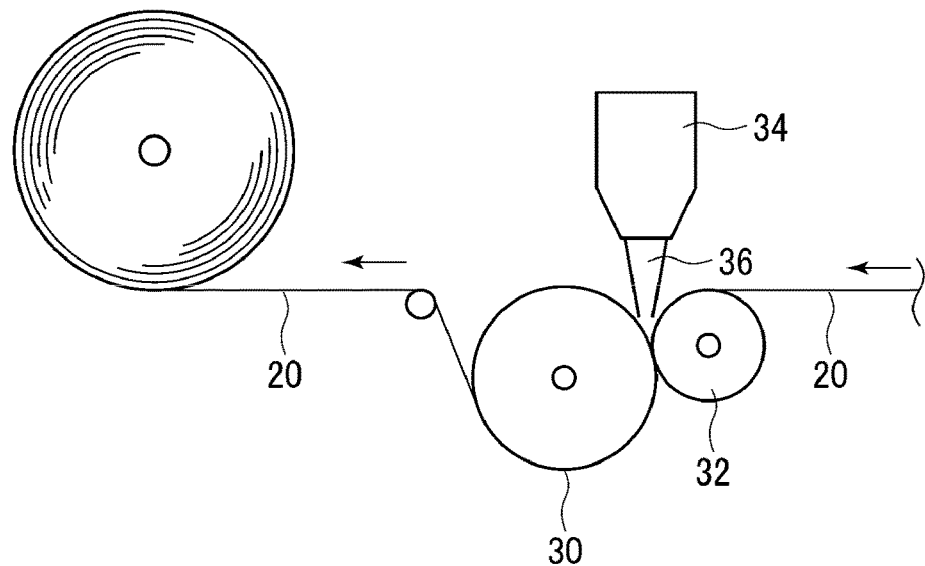
FIG. 4 is a drawing illustrating a method for manufacturing a packing material for use in a packaging container according to an embodiment of the present invention.

A method for manufacturing a packaging container according to an embodiment of the present invention will be described. FIG. 4 is a drawing illustrating a method for manufacturing a packing material for use in the packaging container according to the present embodiment.

An outline of the method for manufacturing the packaging container will be described.

The packing material 20 which forms the packaging container 10 is formed by laminating the outside resin layer 21, the paper core layer 22, the adhesive resin layer 23, the barrier layer 24, the inner coating layer 25, and the inside resin layer 26.

A case will be described in which protrusions having a fractal structure are formed on the surface of the outside resin layer 21 of the packing material 20.

FIG. 4 illustrates the final step for the packing material 20 laminated in this way. In this final step, the outside resin layer 21 is laminated to complete the packing material 20.

When the packing material 20 being conveyed from the right hand side in FIG. 4 is supplied between rollers 30, 32, molten synthetic resin material 36 is extruded between the rollers 30, 32 from a die 34. The extruded high-temperature synthetic resin material 36 is cooled by means of the roller 30 to form the outside resin layer 21. Recessed portions comprising fine holes are formed in advance in the outer surface of the roller 30.

For example, the outer surface of the roller 30, which is a die, is treated using techniques such as surface roughening by means of chemical treatment, electric discharge machining, a cutting process, or sandblasting, for example, either singly or in combination, to machine a shape for forming the protrusions having a fractal structure on the molded article. When the synthetic resin material 36 is being cooled by the rollers 30, 32, the fractal structure on the outer surface of the roller 30 is transferred to the outer surface of the laminated synthetic resin material 36. Although there is no particular restriction to the method for manufacturing the roller 30, which is a die, in order to form a desired fractal structure on the outer surface of the roller 30, it is desirable to provide unevenness on the surface of the roller, and then to polish and/or etch protruding parts to shave off some of an upper portion of the shape of the protruding parts, so as to employ a roller having recessed portions comprising fine holes on the surface thereof. As a result, only protruding parts (ridge parts) are formed on the surface of the resin material 36 after transfer, and almost no recessed parts (valley parts) are formed. Adopting a surface shape having only protruding parts, with almost no recessed parts, as described above, makes it possible to prevent a phenomenon whereby water droplets are caught by recessed parts (valley parts), and do not slide readily along the surface.

The packing material 20 to which the outside resin layer 21 has been laminated in the final step is conveyed toward the left in FIG. 4, and is wound into a roll shape.

If protrusions having a fractal structure are to be formed on the surface of the inside resin layer 26 of the packing material 20, the inside resin layer 26 is laminated in the final step illustrated in FIG. 4 to complete the packing material 20.

When the packing material 20 being conveyed from the right hand side in FIG. 4 is supplied between the rollers 30, 32, the molten synthetic resin material 36 is extruded between the rollers 30, 32 from the die 34.

The extruded high-temperature synthetic resin material 36 is cooled by means of the roller 30 to form the inside resin layer 26. Recessed portions comprising fine holes are formed in advance in the outer surface of the roller 30. When the synthetic resin material 36 is being cooled by the roller 30, protrusions having a fractal structure are formed on the outer surface of the laminated synthetic resin material 36.

The packing material 20 to which the inside resin layer 26 has been laminated in the final step is conveyed toward the left in FIG. 4, and is wound into a roll shape.

In the present invention, the desired fractal structure is implemented on the inside or the outside surface of a packaging container such as a Tetra Brik (registered trademark) or a Tetra Rex (registered trademark), for example, using a roller, but the desired fractal structure may be implemented on the surface of the inner surface or the outer surface of the packaging container using a die or the like, instead of a roller. Further, in a packaging container such as a Tetra Top (registered trademark) in which a synthetic resin portion is formed by injection molding in an upper portion of the container main body of the packaging container, a fractal structure may be formed on the inside or the outside surface of the synthetic resin portion by forming recessed portions comprising fine holes in a die used for the injection molding.

(Method for Sterilizing Packaging Container)

When a packaging container is used for food product applications, the packing material is generally disinfected or sterilized using a hydrogen peroxide solution before the container is filled with contents. However, with a water-repellent surface having an uneven surface, the hydrogen peroxide solution may not come into sufficient contact with the surface, and there may be cases in which adequate disinfection or sterilization does not occur.

It is thus desirable in the present invention to carry out disinfection and sterilization of the packing material by irradiation using gamma ray or electron beam radiation, for example, instead of disinfection or sterilization using a hydrogen peroxide solution.

Modified Embodiment

The present invention is not limited to the embodiments and examples described hereinabove. Various improvements and design changes can be made to the present invention on the basis of the knowledge of persons skilled in the art, without deviating from the gist of the present invention, and such various improvements and design changes are included in the present invention.

Exemplary Embodiments, Comparative Examples

Exemplary embodiments 1 to 10 of the present invention, and comparative examples 1 to 6 are shown.

TABLE 1

| | Die | Polyethylene MFR | Contact angle (°) | Fall angle (°) | Fractal dimension | Ease of detaching from die |
|---|---|---|---|---|---|---|
| Exemplary embodiment 1 | A | 8.2 | 130 | 2 | 1.09 | Easy |
| Exemplary embodiment 2 | A | 55 | 131 | 1 | 1.08 | Easy |
| Exemplary embodiment 3 | A | 8.2 | 126 | 1 | 1.08 | Easy |
| Exemplary embodiment 4 | A | 8.2 | 132 | 2 | 1.08 | Easy |
| Exemplary embodiment 5 | S | 8.2 | 145 | 1 | 1.17 | Easy |
| Exemplary embodiment 6 | S | 8.2 | 138 | 5 | 1.12 | Easy |
| Exemplary embodiment 7 | S | 8.2 | 142 | 6 | 1.11 | Easy |
| Exemplary embodiment 8 | S | 8.2 | 136 | 6 | 1.10 | Easy |
| Exemplary embodiment 9 | S | 8.2 | 141 | 6 | 1.19 | Difficult |
| Exemplary embodiment 10 | S | 8.2 | 141 | 6 | 1.18 | Somewhat difficult |
| Comparative Example 1 | A | 8.2 | 92 | 16 | 1.01 | Very easy |
| Comparative Example 2 | A | 55 | 95 | 16 | 1.00 | Very easy |
| Comparative Example 3 | A | 8.2 | 114 | >16 | 1.01 | Very easy |
| Comparative Example 4 | A | 8.2 | 115 | >16 | 1.02 | Very easy |
| Comparative Example 5 | N | 8.2 | 137 | >16 | 1.06 | Easy |
| Comparative Example 6 | N | 55 | 137 | >16 | 1.07 | Easy |

Die
A: Aluminum sheet and etching
S: Stainless steel sheet, thermal spraying, and polishing
N: Nickel mold Exemplary Embodiment 1

A 3 mm thick aluminum sheet (made from aluminum alloy (JIS5052P)) having surface roughness parameters Ra=0.21 μm and Rz=1.43 μm was prepared, and was immersed for 20 minutes in a 0.25 N aqueous solution of sodium hydroxide at a room temperature of 25° C. to subject the surface thereof to chemical etching treatment, to fabricate a die.

Next, using a press machine, low-density polyethylene having a density of 912 kg/m³ and an MFR of 8.2 was melted at 150° C. and was pressed against the die with a pressure of 2 MPa to transfer the microstructure of the die, yielding a polyethylene molded product having a thickness of approximately 0.3 mm and including multiple protrusions on the surface.

Figure 5A:
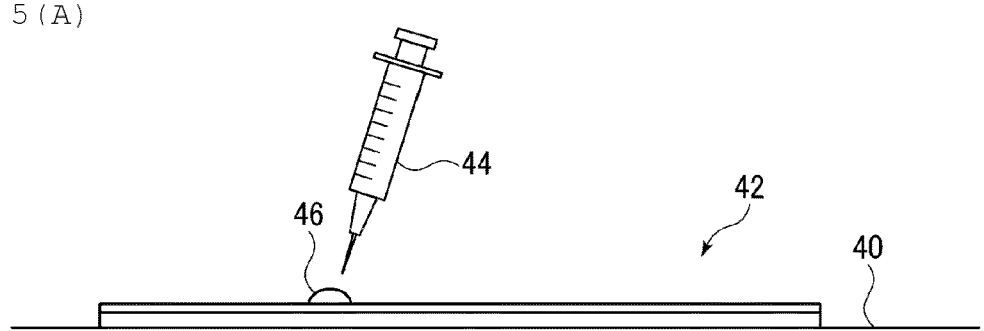
FIGS. 5(A), 5(B) and 5(C) are drawings illustrating a method for measuring a fall angle of a packing material for use in a packaging container according to an embodiment of the present invention.
Figure 5B:
Figure 5C:
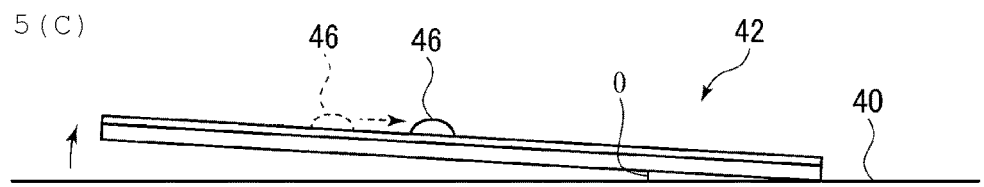

The contact angle of water with respect to the surface of the resulting polyethylene molded product having the microstructure was measured by dripping a 1 to 5 μL water droplet onto the surface using a contact angle measuring instrument. The fall angle (slide angle) θ was measured as illustrated in FIGS. 5(A)-5(C). First, a sample 42 was placed on a horizontal platform 40, and a water droplet 46 of approximately 0.1 μL was dripped onto the specimen 42 from an injection needle 44 FIG. 5(A)). Next, the sample 42 was gradually tilted, and the angle θ at which the water droplet 46 slid along the sample 42 was defined as the fall angle (FIGS. 5(B) and 5(C)).

Figure 6A:
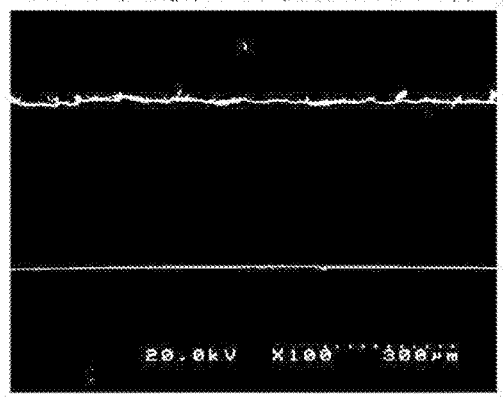
FIGS. 6(A), 6(B) and 6(C) are cross sectional SEM photographs of exemplary embodiment 1 of a packing material for use in a packaging container according to an embodiment of the present invention.
Figure 6B:
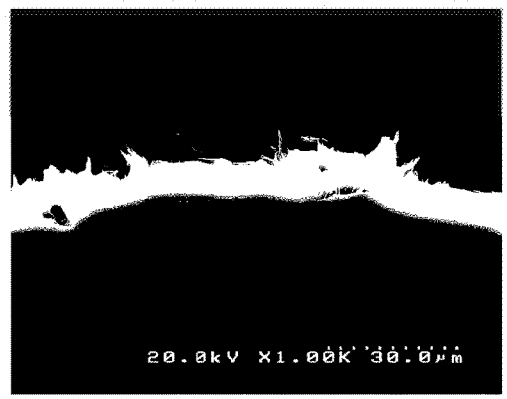
Figure 6C:
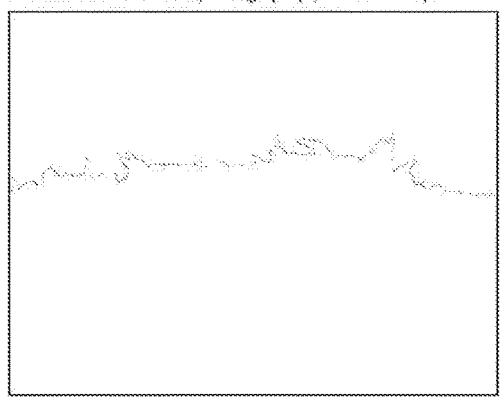
Figure 7:
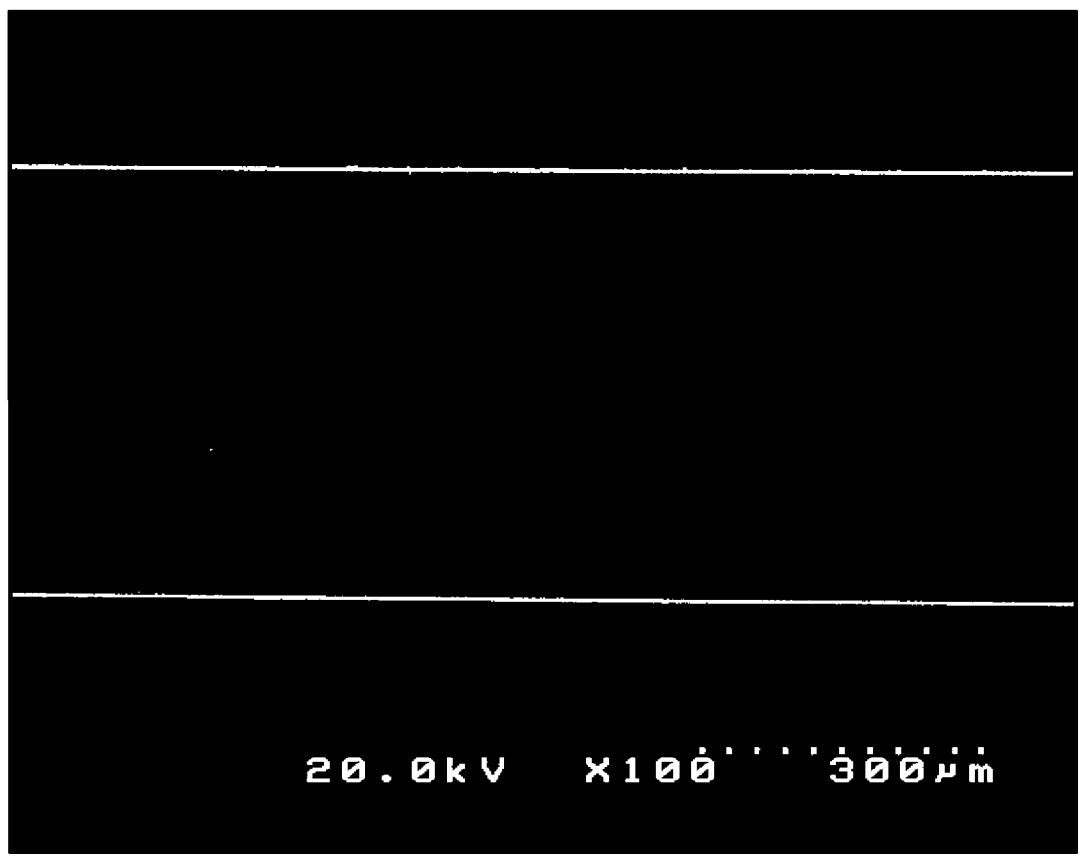
FIG. 7 is a cross sectional SEM photograph of comparative example 1 of a packing material for use in a packaging container according to an embodiment of the present invention.

The fractal dimension of the polyethylene molded product was obtained from an SEM image. First, SEM imaging of a 30 μm thick slice, cut using a microtome from a cross section through the polyethylene molded product, which had been cooled using liquid nitrogen, was carried out. Next, the outline of the molded product cross section was extracted from the SEM captured image, and the fractal dimension was obtained. More specifically, an SEM photographic image in which one pixel corresponded to a 0.75 μm square was used (FIG. 6(B)). In order to evaluate the effect of protrusions formed at random on the surface of the sample having depth, the outline of the protrusions was extracted as a continuous locus of one pixel (FIG. 6(C)). The fractal dimension was calculated from the extracted drawing using the box counting method. The results of the measurement for a polyethylene molded product employing the die in exemplary embodiment 1 were a water contact angle of 130°, a fall angle of 2°, and a fractal dimension of 1.09. It should be noted that the number of pixels in FIG. 6(C) is 1,648×1,300. The same measuring method was used hereinafter.

Exemplary Embodiment 2

Using the same die as in exemplary embodiment 1, a polyethylene molded product having a fine protrusion structure was obtained under the same conditions, using low-density polyethylene having a density of 923 kg/m³ and an MFR of 55. The water contact angle was 131°, the fall angle was 1°, and the fractal dimension was 1.08.

Exemplary Embodiment 3

Using the same aluminum alloy sheet as in exemplary embodiment 1, concavity processing was carried out by sandblasting. The surface roughness parameters after sandblasting were Ra=2.86 μm and Rz=16.43 μm. Next, chemical etching treatment was carried out under the same conditions as in exemplary embodiment 1 to obtain a die. This die was used to obtain a polyethylene molded product in the same way as in exemplary embodiment 1. The water contact angle of the resulting molded product was 126°, the fall angle was 1°, and the fractal dimension was 1.08.

Exemplary Embodiment 4

Using the same aluminum alloy sheet as in exemplary embodiment 1, concavity processing was carried out by sandblasting. The surface roughness parameters after sandblasting were Ra=6.32 μm, Rp=16.68 μm, and Rz=30.41 μm. Next, chemical etching treatment was carried out under the same conditions as in the exemplary embodiments to obtain a die. This die was used to obtain a polyethylene molded product in the same way as in exemplary embodiment 1. The water contact angle of the resulting molded product was 115°, the fall angle was 2°, and the fractal dimension was 1.08.

Exemplary Embodiment 5

Using a 3 mm thick stainless steel (SUS360) sheet, porous ceramic thermal spraying was performed, after which surface polishing was performed to fabricate a die having surface roughness parameters Ra=1.91 μm and Rz=13.53 μm. A polyethylene molded product was obtained under the same conditions as in exemplary embodiment 1. The water contact angle of the resulting molded product was 145°, the fall angle was 1°, and the fractal dimension was 1.17.

Exemplary Embodiments 6 to 9

Dies having mutually different surface roughness parameters were fabricated using the same process as in exemplary embodiment 5. Then, polyethylene molded products were obtained under the same conditions as in exemplary embodiment 1. The die in exemplary embodiment 6 had surface roughness parameters Ra=2.28 μm and Rz=16.14 μm, and the resulting molded product had a water contact angle of 138°, a fall angle of 5°, and a fractal dimension of 1.12; the die in exemplary embodiment 7 had surface roughness parameters Ra=7.24 μm and Rz=45.95 μm, and the resulting molded product had a water contact angle of 142°, a fall angle of 6°, and a fractal dimension of 1.11; the die in exemplary embodiment 8 had surface roughness parameters Ra=3.01 μm and Rz=23.16 μm, and the resulting molded product had a water contact angle of 136°, a fall angle of 6°, and a fractal dimension of 1.10; and the die in exemplary embodiment 9 had surface roughness parameters Ra=5.35 μm and Rz=30.56 μm, and the resulting molded product had a water contact angle of 141°, a fall angle of 1°, and a fractal dimension of 1.19.

Embodiment 10

Using the same die as in exemplary embodiment 9, low-density polyethylene having a density of 912 kg/m$^3$ and an MFR of 8.2 was melted at 150° C. and was pressed against the die with a pressure of 1 MPa to obtain a polyethylene molded product. The water contact angle of the resulting molded product was 141°, the fall angle was 1°, and the fractal dimension was 1.18.

Comparative Example 1

The same aluminum alloy sheet as in exemplary embodiment 1 was used as a die, without having been subjected to chemical etching treatment, and the surface shape was transferred to polyethylene under the same conditions as in exemplary embodiment 1. The water contact angle of the resulting molded product was 92°, the fall angle was 16°, and the fractal dimension was 1.01.

Comparative Example 2

The same aluminum alloy sheet as in exemplary embodiment 1 was used as a die, without having been subjected to chemical etching treatment, and the surface shape was transferred to polyethylene under the same conditions as in exemplary embodiment 2. The water contact angle of the resulting molded product was 95°, the fall angle was 16°, and the fractal dimension was 1.00.

Comparative Example 3

The same aluminum alloy sheet as in exemplary embodiment 3, subjected to blasting treatment, was used as a die, without having been subjected to chemical etching treatment, and a polyethylene molded product was obtained under the same conditions as in exemplary embodiment 1. The water contact angle of the resulting molded product was 114°, the fall angle was >16°, and the fractal dimension was 1.01.

Comparative Example 4

The same aluminum alloy sheet as in exemplary embodiment 4, subjected to blasting treatment, was used as a die, without having been subjected to chemical etching treatment, and a polyethylene molded product was obtained under the same conditions as in exemplary embodiment 1. The water contact angle of the resulting molded product was 115°, the fall angle was >16°, and the fractal dimension was 1.02.

Comparative Example 5

A polyethylene molded product was obtained under the same conditions as in exemplary embodiment 1, using a commercially available hole-type nickel mold (period 3 μm, diameter 1.7 μm, depth 1.5 μm). The water contact angle of the resulting molded product was 137°, the fall angle was >16°, and the fractal dimension was 1.06.

Comparative Example 6

A polyethylene molded product was obtained under the same conditions as in exemplary embodiment 2, using the same die as in comparative example 5. The water contact angle of the resulting molded product was 137°, the fall angle was >16°, and the fractal dimension was 1.07.

Summary of Exemplary Embodiments and Comparative Examples

As illustrated in Table 1, the fractal dimensions of surfaces exhibiting the same fall angle differ depending on the method used to fabricate the die, and this is thought to reflect differences in the surface structure. With a molded product having protrusions formed on the surface, and having a fractal dimension, obtained by an analysis of the cross section, at least equal to 1.08, it could be confirmed that the fall angle was small, being at most equal to 6°, irrespective of the method used to fabricate the die, and non-adhesion was good. Further, ease of detaching when removing the molded product from the die was difficult if the fractal dimension of the molded product was greater than 1.17. Therefore, in consideration of ease of mass production of the packaging container, the fractal dimension is desirably at most equal to 1.17.

EXPLANATION OF THE REFERENCE CODES

10 . . . Packaging container
12 . . . Packaging container main body
14 . . . Cap
20 . . . Packing material
21 . . . Outside resin layer
22 . . . Paper core layer
23 . . . Adhesive resin layer
24 . . . Barrier layer
25 . . . Inner coating layer
26 . . . Inside resin layer
30, 32 . . . Rollers
34 . . . Die
36 . . . Synthetic resin material
40 . . . Platform
42 . . . Sample
44 . . . Injection needle
46 . . . Water droplet

The invention claimed is:

1. A packaging container for food products, wherein:
the packaging container includes at least an outside resin layer, a paper core layer, and an inside resin layer;
the surface of the inside resin layer does not contain fine particles for adjusting the surface roughness, and fine protrusions for making the food product less liable to remain on the inside surface of the packaging container are formed on the surface of the inside resin layer; and
a fractal dimension of the structure of the fine protrusions is 1.08 and more to 1.17 and less, where the fractal dimension is a numerical value obtained by means of a box counting method at a resolution at which the length per one pixel is 0.5 to 1.0 μm.

2. A packaging container for food products, wherein:
the packaging container includes at least an outside resin layer, a paper core layer, and an inside resin layer;
the surface of the outside resin layer does not contain fine particles for adjusting the surface roughness, and fine protrusions for reducing adhesion and retention of water droplets during manufacture of the packaging container are formed on the surface of the outside resin layer; and
a fractal dimension of the structure of the fine protrusions is 1.08 and more to 1.17 and less, where the fractal dimension is a numerical value obtained by means of a box counting method at a resolution at which the length per one pixel is 0.5 to 1.0 μm.

3. A packaging container for food products, wherein:
the packaging container includes a container main body, a synthetic resin portion provided in an upper portion of the container main body, and a cap provided on an upper portion of the synthetic resin portion;
the inside surface of the synthetic resin portion does not contain fine particles for adjusting the surface roughness, and fine protrusions for making the food product less liable to remain on the inside surface of the synthetic resin portion are formed on the inside surface of the synthetic resin portion; and
a fractal dimension of the structure of the fine protrusions is 1.08 and more to 1.17 and less, where the fractal dimension is a numerical value obtained by means of a box counting method at a resolution at which the length per one pixel is 0.5 to 1.0 μm.

4. A packaging container for food products, wherein:
the packaging container includes a container main body, a synthetic resin portion provided in an upper portion of the container main body, and a cap provided on an upper portion of the synthetic resin portion;
the outer surface of the synthetic resin portion does not contain fine particles for adjusting the surface roughness, and fine protrusions for reducing adhesion and retention of water droplets during manufacture of the packaging container are formed on the outside surface of the synthetic resin portion; and
a fractal dimension of the structure of the fine protrusions is 1.08 and more to 1.17 and less, where the fractal dimension is a numerical value obtained by means of a box counting method at a resolution at which the length per one pixel is 0.5 to 1.0 μm.

5. The packaging container as claimed in claim 1, wherein the outside resin layer or the inside resin layer includes a polyolefin resin.

6. The packaging container as claimed in claim 5, wherein the polyolefin resin includes polyethylene.

7. The packaging container as claimed in claim 2, wherein the outside resin layer or the inside resin layer includes a polyolefin resin.

8. The packaging container as claimed in claim 7, wherein the polyolefin resin includes polyethylene.

* * * * *